US010051158B2

(12) United States Patent
Kimura

(10) Patent No.: US 10,051,158 B2
(45) Date of Patent: Aug. 14, 2018

(54) CONTROL APPARATUS FOR IMAGE PICKUP APPARATUS

(71) Applicant: Shimadzu Corporation, Kyoto (JP)

(72) Inventor: Kenji Kimura, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 49 days.

(21) Appl. No.: 15/302,225

(22) PCT Filed: Mar. 2, 2015

(86) PCT No.: PCT/JP2015/056069
§ 371 (c)(1),
(2) Date: Oct. 6, 2016

(87) PCT Pub. No.: WO2015/156057
PCT Pub. Date: Oct. 15, 2015

(65) Prior Publication Data
US 2017/0034402 A1    Feb. 2, 2017

(30) Foreign Application Priority Data

Apr. 10, 2014 (JP) ................................. 2014-080647

(51) Int. Cl.
*H04N 5/335* (2011.01)
*H04N 5/073* (2006.01)
(Continued)

(52) U.S. Cl.
CPC ........... *H04N 5/0736* (2013.01); *H04N 5/232* (2013.01); *H04N 5/3765* (2013.01); *H04N 5/37455* (2013.01); *H04N 5/77* (2013.01)

(58) Field of Classification Search
CPC ... G09G 2320/0247; G09G 2340/0435; G09G 2320/0261; G09G 3/2018
See application file for complete search history.

(56) References Cited

U.S. PATENT DOCUMENTS 9,569,992 B2 * 2/2017 Yamazaki ................ G09G 3/20
2005/0280623 A1 * 12/2005 Tani ..................... G09G 3/3611
345/98

(Continued)

FOREIGN PATENT DOCUMENTS

JP    11-296155    10/1999
JP    2001-228816    8/2001

*Primary Examiner* — Trung Diep
(74) *Attorney, Agent, or Firm* — Muir Patent Law, PLLC

(57) ABSTRACT

Provided is a control apparatus for an image pickup apparatus that can synchronize an image sensor with a frame period from an external device, such as a display apparatus, without use of any frame buffer, while optimizing the frequency of a clock signal used for the operation of the image sensor. An image sensor (11) receives a trigger signal from an external device (2), such as a display apparatus, and image data from an image sensor (11); calculates, for each frame, information of a time difference from the trigger signal to a time at which to start the output of the image data; and establishes, on the basis of the information of the time difference, a frame period of the image sensor (11) such that the time difference is accommodated within a given range, thereby allowing the image data to be supplied to the external device (2) within a given time difference relative to the trigger signal, though some degree of variation occurring in each frame.

8 Claims, 8 Drawing Sheets

(51) Int. Cl.
*H04N 5/3745* (2011.01)
*H04N 5/77* (2006.01)
*H04N 5/376* (2011.01)
*H04N 5/232* (2006.01)

(56) References Cited

U.S. PATENT DOCUMENTS

| | | | |
|---|---|---|---|
| 2007/0046658 A1* | 3/2007 | Sakamaki | G09G 3/3611 345/204 |
| 2009/0096910 A1* | 4/2009 | Yasuda | H04N 5/23293 348/333.01 |
| 2010/0020210 A1* | 1/2010 | Tsunekawa | H04N 5/232 348/294 |
| 2011/0200316 A1* | 8/2011 | Sugiura | G02B 7/10 396/131 |
| 2014/0132643 A1* | 5/2014 | Yamazaki | G09G 3/20 345/690 |

* cited by examiner

Frame rate: 60 (fps)  Frame period set initial value Tnow: 1060 (line)
Sensor line period: 15.72 (μs)  Frame period set maximum value Tmax: 1061 (line)
FOPGA frequency: 100 (MHz)  Frame period set minimum value Tmin: 1060 (line)
 Threshold Th: 196 (clk)

| Frame No | Trigger period (clk) | Sensor period (clk) | Period difference (clk) | Cumulative Period difference Total(clk) | ≥Th | ≤-Th | Tnow<Tmax | Tnow>Tmin | Initial value Tnow (line) |
|---|---|---|---|---|---|---|---|---|---|
| 1 | 1,666,667 | 1,666,320 | 347 | 347 | O | | | | 1061 |
| 2 | 1,666,667 | 1,666,320 | 347 | 693 | O | | | | 1061 |
| 3 | 1,666,667 | 1,667,892 | -1,225 | -532 | | | | | 1060 |
| 4 | 1,666,667 | 1,667,892 | -1,225 | -1,757 | | O | O | | 1060 |
| 5 | 1,666,667 | 1,666,320 | 347 | -1,411 | | O | O | | 1060 |
| 6 | 1,666,667 | 1,666,320 | 347 | -1,064 | | O | O | | 1060 |
| 7 | 1,666,667 | 1,666,320 | 347 | -717 | | O | O | | 1060 |
| 8 | 1,666,667 | 1,666,320 | 347 | -371 | | O | O | | 1060 |
| 9 | 1,666,667 | 1,666,320 | 347 | -24 | | | O | | 1060 |
| 10 | 1,666,667 | 1,666,320 | 347 | 323 | O | | | | 1061 |
| 11 | 1,666,667 | 1,666,320 | 347 | 669 | O | | | | 1061 |
| 12 | 1,666,667 | 1,667,892 | -1,225 | -556 | | O | O | | 1060 |
| 13 | 1,666,667 | 1,667,892 | -1,225 | -1,781 | | O | O | | 1060 |
| 14 | 1,666,667 | 1,666,320 | 347 | -1,435 | | O | O | | 1060 |
| 15 | 1,666,667 | 1,666,320 | 347 | -1,088 | | O | O | | 1060 |
| 16 | 1,666,667 | 1,666,320 | 347 | -741 | | O | O | | 1060 |
| 17 | 1,666,667 | 1,666,320 | 347 | -395 | | O | O | | 1060 |
| 18 | 1,666,667 | 1,666,320 | 347 | -48 | | | O | | 1060 |
| 19 | 1,666,667 | 1,666,320 | 347 | 299 | O | | | | 1061 |
| 20 | 1,666,667 | 1,666,320 | 347 | 645 | O | | | | 1061 |
| 21 | 1,666,667 | 1,667,892 | -1,225 | -580 | | O | O | | 1060 |
| 22 | 1,666,667 | 1,667,892 | -1,225 | -1,805 | | O | O | | 1060 |
| 23 | 1,666,667 | 1,666,320 | 347 | -1,458 | | O | O | | 1060 |
| 24 | 1,666,667 | 1,666,320 | 347 | -1,112 | | O | O | | 1060 |
| 25 | 1,666,667 | 1,666,320 | 347 | -765 | | O | O | | 1060 |

Fig. 6

CONTROL APPARATUS FOR IMAGE PICKUP APPARATUS

TECHNICAL FIELD

The present invention relates to a control apparatus for an image pickup apparatus equipped with an image sensor for outputting image data of a CMOS sensor, etc., and also to a control apparatus of an image pickup apparatus for capturing a moving image in synchronization with a trigger signal from an external device, such as, e.g., a display apparatus and a recording device.

BACKGROUND ART

In cases where image data from an image pickup apparatus using an image sensor, such as, e.g., a CMOS sensor, is displayed on a display apparatus as a moving image, it is preferable to acquire the image data from the image sensor in synchronization with the timing of a frame display of an image in a display apparatus. When the image sensor and the display apparatus differ in frame period, a method is known in which a memory (frame buffer) and a memory control circuit are arranged inside the display apparatus or between the display apparatus and the image sensor to once store frame data (image data of one frame) and output the frame data at the timing of the frame display of the display apparatus, i.e., in synchronization with the display operation of the display apparatus (see, e.g., Patent Document 1).

This method, however, has the following problems. It is required to store image data of one frame to several frames in a memory. This not only requires a large-capacity memory, which increases the device configuration size, but also requires a complicated circuit, which increases the cost. Further, display delay occurs due to the time required for the writing or reading operation with respect to the memory (frame buffer).

Further, when acquiring the same image by a plurality of image sensors, although it is preferable to synchronize the image acquisition timings (frame timings) of the plurality of image sensors. However, it is difficult to do so in the aforementioned method.

Among image sensors, there exists an image sensor having a mode called external trigger mode other than an internal frame synchronous operation mode (VIDEO mode) with a fixed timing of the inside of the image sensor. In this external trigger mode, since a synchronous operation by the external trigger can be performed, the frame memory as described above becomes unnecessary.

In some image sensors, however, there exist an sensor not having an external trigger mode and an sensor having an external trigger mode but its function is limited (for example, it cannot perform overlap that simultaneously performs exposure and image output of the previous frame and therefore speeding up cannot be performed). In such a sensor, even if it is good in performance, the sensor should be used in the internal frame synchronous operation mode (VIDEO mode), and therefore it was necessary to resynchronize using a frame buffer and a memory control.

Further, as a method not using a frame buffer, conventionally, a method is known in which a frequency of an operation clock of an image sensor is determined and generated from a period of a frame synchronization signal on an external device side and the number of clocks required for one frame, i.e., an operation clock of the image sensor is set to a frequency corresponding to the frame period of the external device (see, e.g., Patent Document 2). In some image sensors, however, there exists a device requiring a clock input of a recommended frequency to obtain a favorable performance. For such an image sensor, it is impossible to apply such a method.

PRIOR ART DOCUMENT

Patent Document

Patent Document 1: Japanese Unexamined Patent Application Publication No. H11-296155
Patent Document 1: Japanese Unexamined Patent Application Publication No. 2001-228816

SUMMARY OF THE INVENTION

Problems to be Solved by the Invention

The present invention was made to solve various problems of the aforementioned prior arts, and aims to provide a control apparatus for an image pickup apparatus capable of synchronizing an image sensor with a frame period from an external device without using a complicated circuit, such as, e.g., a frame buffer and a control circuit, while making a frequency of an operation clock of the image sensor as a recommended frequency, even if the image sensor does not have an external trigger mode or is substantially unable to apply an external trigger mode.

Means for Solving the Problems

In order to solve the aforementioned problems, a control apparatus for an image pickup apparatus according to the present invention is characterized in that a control apparatus for an image pickup apparatus equipped with an image sensor for outputting image data, includes:

external trigger signal receiving means configured to receive a trigger signal from an external device to which the image data is output;

image data receiving means configured to receive the image data from the image sensor;

time difference calculation means configured to calculate information of a time difference from the trigger signal to a time point at which the image sensor initiates an output of the image data for each frame, based on respective received results of the external trigger signal receiving means and the image data receiving means; and frame period set means configured to set a frame period of the image sensor, wherein the frame period set means is configured to set a frame period of the image sensor so that the time difference falls within a given range, on a basis of the information of the time difference calculated by the time difference calculation means.

In the present invention, it may be configured such that the frame period of the image sensor is capable of setting only at a specified time unit, and wherein the time difference calculation means includes trigger period measurement means configured to measure a time from a time point of receiving a last trigger signal every time the trigger signal is received, frame period measurement means configured to measure a time from an initiation time point of receiving the last image data every initiation of receiving the image data from the image sensor, period difference calculation means configured to calculate a period difference between the trigger period and the frame period, and period difference accumulation means configured to accumulate the period difference calculated by the period difference calculation means for each frame, wherein a cumulative value of the period difference calculated by the period difference calculation means is used as the information of the time difference, and wherein the frame period set means compares the cumulative value of the period difference and a threshold, and uses a compared result as one condition of setting change of the frame period of the image sensor.

Further, in the present invention, it is possible to employ a structure in which the control apparatus further includes:

a buffer configured to temporality store the image data from the image sensor;

write control means configured to control writing to the buffer; and read control means configured to control reading from the bugger, wherein the write control means performs writing to the buffer at an image data output timing of the image sensor, and wherein the read control means performs reading of the image data from the buffer at a timing later than a timing of the writing in a state in which a time difference from the trigger signal to the output initiation of the image data is maximum.

The present invention is sought to solve the problems by receiving a trigger signal from an external device and image data from an image sensor, monitoring a time difference from the trigger signal to an output initiation timing of the image data from the image sensor for each frame, and automatically setting the frame period of the image sensor so that the time difference falls within a given range.

That it is, without fixing a frame period of the image sensor to an initially set period, the time difference from the trigger signal from the external device to an output initiation time point of the image data for each frame is monitored, and the setting of the frame period of the image sensor is changed as needed so that the time difference falls within a given range. With this, although there is some degree of variation with respect to the trigger signal, the output of the image data is initiated within a given time range. Thus, even in an image sensor not equipped with an external trigger mode, it is possible to essentially realize an external trigger synchronization.

Here, in many cases, normally, setting of a frame period of an image sensor can be performed by a prescribed time unit, for example, a time unit corresponding to one line period (period for transferring image data of one line in the horizontal direction of the image), and therefore a period of an external trigger signal and a frame period of the image sensor cannot be matched completely. Therefore, as a specific method of the frame period set operation, a method may be employed in which the period difference between the trigger period and the frame period is obtained for each frame, the period difference is accumulated, using that the cumulative value corresponds to the time difference from the trigger signal to the image data output initiation time point, the cumulative value and a given threshold are compared, and the compared result is set as one condition of the period setting change.

That is, a frame period of an image sensor can be set only by a time unit corresponding to one line period, and therefore a slight difference occurs inevitably between the frame period and the trigger period, which gradually causes shifting of the time difference from the trigger signal to the image data output initiation time point for each frame. This is grasped by the cumulative value of the period difference of both periods. When the cumulative value exceeds a given limit, the frame period set change is executed and the operation for returning the shifting is repeated. With this, the time difference from the trigger signal to the output initiation time point of the image data can be set within about a range of time corresponding to several line periods.

Further, as described above, the time difference from the trigger signal to the output initiation of the image data from the image sensor can be set within a given range although there are some degree of variations by the present invention. However, in cases where no variation of the output timing of the image data to the trigger signal is allowed, the following configuration may be employed.

That is, a buffer for accumulating image data and write and read control means are added. Writing of the image data to the buffer is performed at the timing of the image sensor. Reading of the image data from the buffer is performed at the timing having a given time difference with respect to the trigger signal which is later than the timing that the output initiation timing of the image data with respect to the trigger signal becomes latest. With this, the image data can be output at a timing stable to the trigger signal. It is sufficient that the buffer has a capacity capable of storing for the maximum time from the trigger signal to the output initiation time point of the image data, or the data corresponding to several lines in the aforementioned example.

Effects of the Invention

According to the present invention, the time difference from the trigger signal from an external device to the output initiation of the image data from the image sensor is monitored for each frame, and setting change of the frame period of the image sensor is performed sequentially so that the time difference falls within a given range. Although there are some degree of variation in time difference from the trigger signal from the external device to the output initiation of the image data, it is possible to output the image data essentially in synchronization with the trigger signal from the external device. That is, even in the case of using an image sensor not having an external trigger mode, it is possible to realize an external trigger synchronization without providing a frame buffer and without specially changing the frequency of the operation clock of the image sensor.

Further, in cases where no variation of the output timing of the image data to the trigger signal is allowed, by providing a memory capable of accumulating image data of several lines and write and read control means, writing the image data at the timing of the image sensor, and transmitting the image data to the external device by reading at a timing later than a state in which the time difference from the trigger signal to the output initiation of the image data becomes maximum, it is possible to output the image data at a timing stable to the trigger signal.

BRIEF DESCRIPTION OF THE DRAWINGS

FIG. 6 is an explanatory view showing an operation example of a synchronous control according to an embodiment of the present invention.

EMBODIMENTS FOR CARRYING OUT THE INVENTION

Hereinafter, embodiments of the present invention will be described with reference to drawings.

Figure 1:
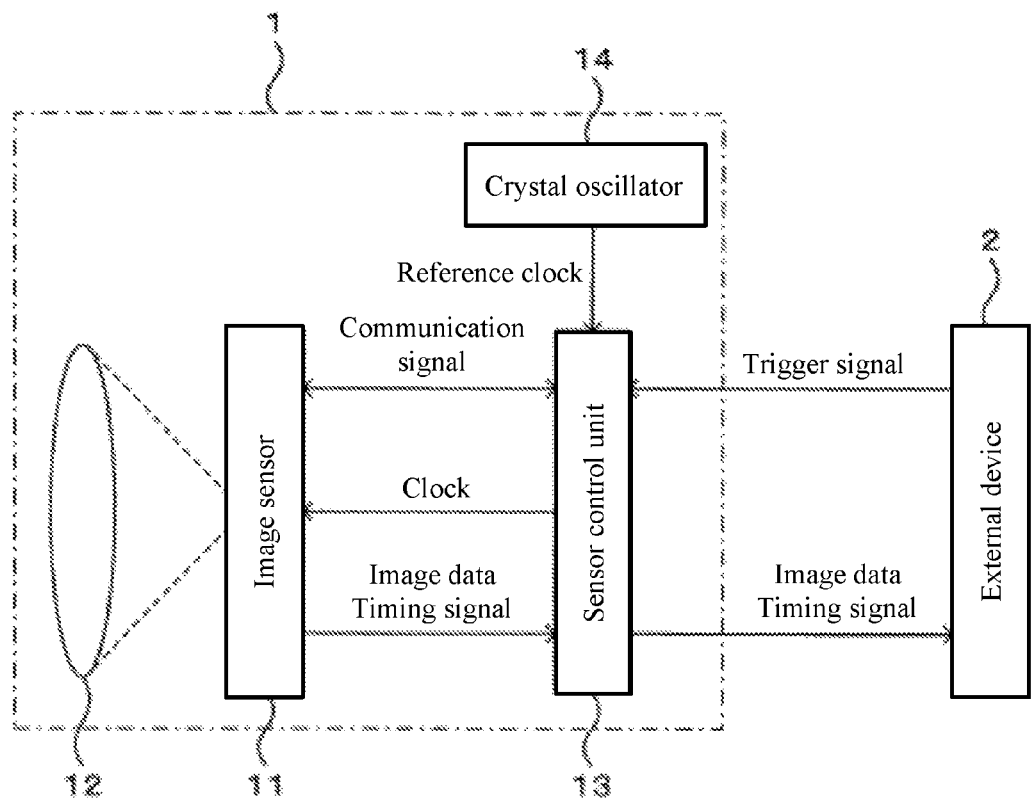
FIG. 1 is a structural view showing a state in which an image pickup apparatus according to the present invention is connected to an external device.

FIG. 1 is a bock diagram showing a structure of an image pickup apparatus according to an embodiment of the present invention in a state in which the image pickup apparatus is connected to an external device, such as, e.g., a display apparatus and a recording apparatus.

The image pickup apparatus 1 is constituted by an image sensor 11 such as a CMOS sensor, an optical lens 12 for forming an object image on a light receiving surface of the image sensor 11, a sensor control unit 13 for controlling the image sensor 11, and a crystal oscillator 14 for supplying a reference clock to the sensor control unit 13 as main components.

The external device 2 is a display apparatus or a video recording apparatus (recording device), and the external device 2 and the image pickup apparatus 1 are connected by an image data transfer cable, such as, e.g., a CameraLink. In order to synchronize the image sensor with the display timing or recording timing, a trigger signal showing the initiation timing of each image output (frame output) is supplied to the sensor control unit 13 from the external device 2.

The image sensor 11 includes an A-D converter in addition to a two-dimensional image pickup element, and transmits object image information formed on the light receiving surface of the image pickup element as digital data. In the image sensor 11, the reset of storage capacitance, the accumulation of charges, the sampling, and the A-D conversion are controlled in a line unit, and the output of the image data of each line is controlled in a pixel unit. These controls are performed by creating timing signals, such as, e.g., a horizontal synchronization signal and a vertical synchronization signal, in the image sensor 11 on a basis of the clock supplied from the sensor control unit 13 which will be described later and performing an operation based on the timing signals. The image data to be output is sent to the sensor control unit 13 with timing signals of a vertical synchronization signal and a horizontal synchronization signal.

The clock to the image sensor 11 is supplied from the sensor control unit 13 as described above. The clock to be supplied to the image sensor 11 and the clock for operating the internal circuit of the sensor control unit 13 are generated by the crystal oscillator 14 connected to the sensor control unit 13. In this embodiment, although the clock is supplied from the sensor control unit 13 to the image sensor 11, the clock may be directly supplied from the crystal oscillator 14 to the image sensor 11.

The image sensor 11 and the sensor control unit 13 are connected by communication signals, and the communication signals are used to set the timing, etc., of the image sensor 11. This timing setting includes setting of the frame period, and the image sensor 11 performs outputting of the image data of each frame at the timing of the set frame period.

In this sensor control unit 13, as will be detailed later, the time difference from the timing of the trigger signal input from the external device 2 to the timing of output initiation of the image data from the image sensor 11 is monitored for each frame to set the frame period of the image sensor 11 so that the time difference falls within a given range. With this control, the time difference from the trigger signal to the output initiation of the image data falls within the given range although there are some degree of variation for each frame. That is, it becomes possible to perform controlling substantially corresponding to external trigger synchronization. In this embodiment, further, the image data is written to the memory at the timing of the image sensor 11 and a countermeasure is taken such that reading of memory is performed at the timing later than the timing of the frame that the image output initiation was performed at the latest timing to the trigger timing, so that it becomes possible to output the image data to the external device 2 at a timing stable to the trigger signal.

Figure 2:
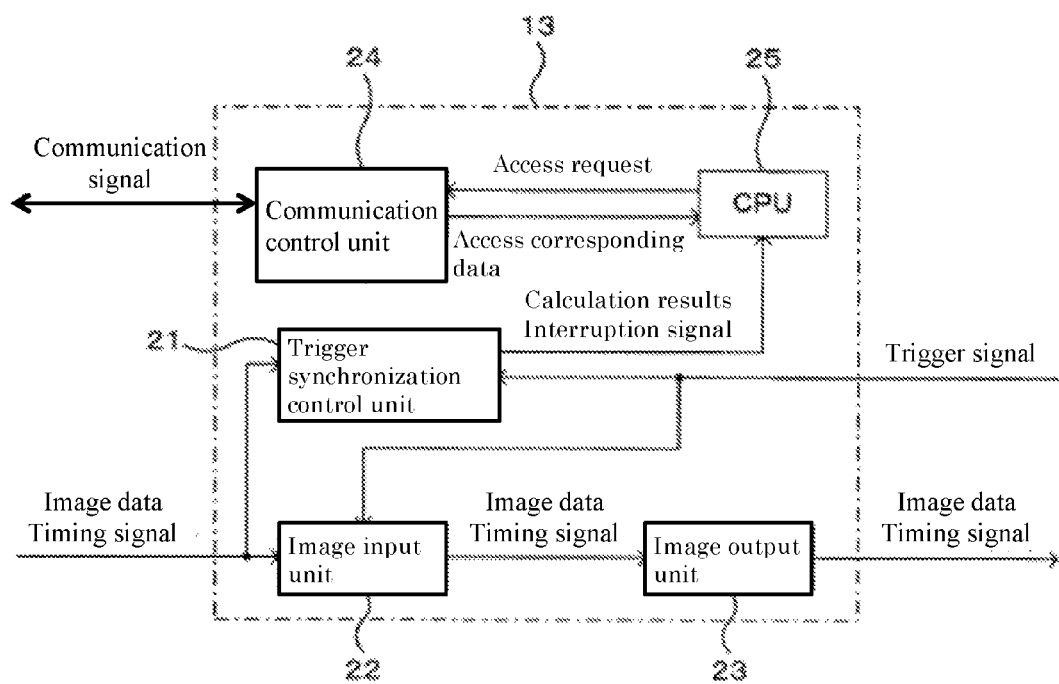
FIG. 2 is a block diagram showing a configuration example of a sensor control unit shown in FIG. 1.

A configuration example of the sensor control unit 13 is shown by a block diagram in FIG. 2. The sensor control unit 13 includes a trigger synchronization control unit 21, an image input unit 22, an image output unit 23, a communication control unit 24, and a CPU 25.

The image input unit 22 receives image data from the image sensor 11. This image input unit 22 is equipped with a memory capable of storing image data of several lines, and is configured to store the input image data at the timing from the image sensor 11, read out the image data stored on the basis of the trigger signal at the timing generated by the image input unit 22, and output the image data. Specific configuration example of this image input unit 22 will be described later.

The image data output from the image input unit 22 is input to the image output unit 23. The image output unit 23 is structured by an interface for outputting the image data to the external device 2 shown in FIG. 1, and is configured to output the input image data by converting it into a CameraLink signal format and signal level. In the example shown in FIG. 2, although the image input unit 22 and the image output unit 23 are directly connected, it may be configured such that an image processing unit is provided between the image input unit 22 and the image output unit 23 to perform image processing, such as, e.g., γ correction and defect correction.

The communication control unit 24 is connected to a CPU 25, and is configured to perform an access to a setting register of the image sensor 11 depending on an access request to the image sensor 11 from the CPU 25. Specifically, it performs operations respectively corresponding to the register address, a write or read request to the image sensor 11 sent from the CPU 25. At the time of a write request, the communication control unit 24 writes data, generates a signal in accordance with the access system (in this example, SPI bus) of the image sensor 11 and output it. At the time of a read request, the communication control unit 24 receives read data sent from the image sensor 11 and outputs the read data to the CPU 25.

In the trigger synchronization control unit 21, a trigger signal from the external device 2 is input, and a valid section signal, which is a timing signal sent along with the image data from the image sensor 11, is input. Further, the trigger synchronization control unit 21 is connected to the CPU 25 by a bus, so that the CPU 25 can read the result calculated by the trigger synchronization control unit 21. Further, the trigger synchronization control unit 21 outputs an interruption signal to the CPU 25, so that the timing that the calculation is complete can be notified to the CPU 25. And, as described later, the trigger synchronization control unit 21 monitors the trigger signal input from the external device 2 and the output initiation timing of the frame data of the image sensor 11 and performs the calculation of the time difference (the number of clocks) from the trigger signal to the image data output initiation timing.

Figure 3:
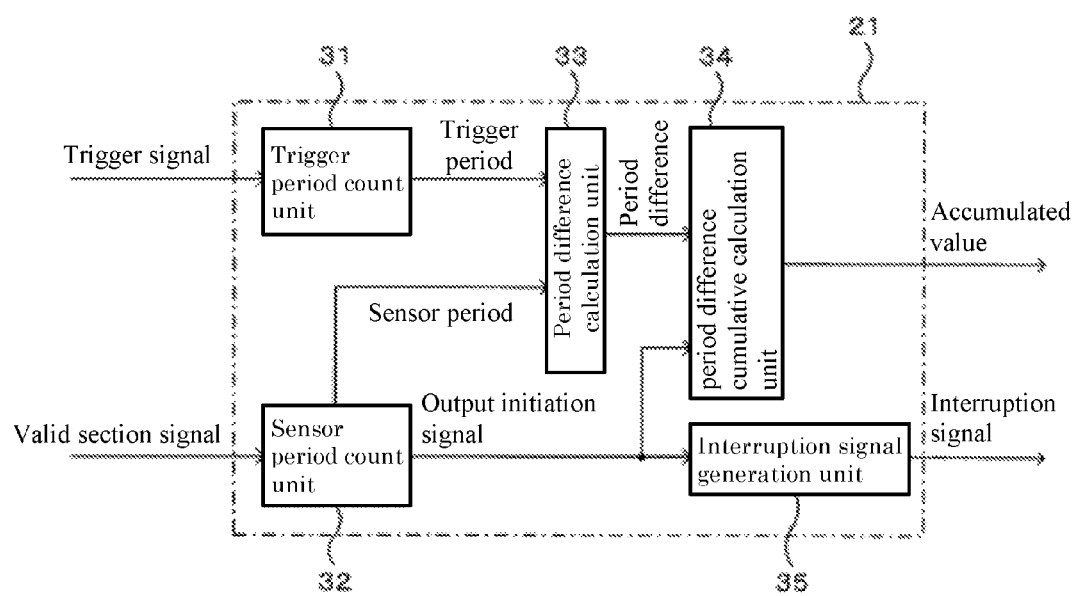
FIG. 3 is a block diagram showing a configuration example of a trigger synchronization control unit shown in FIG. 2.
Figure 4:
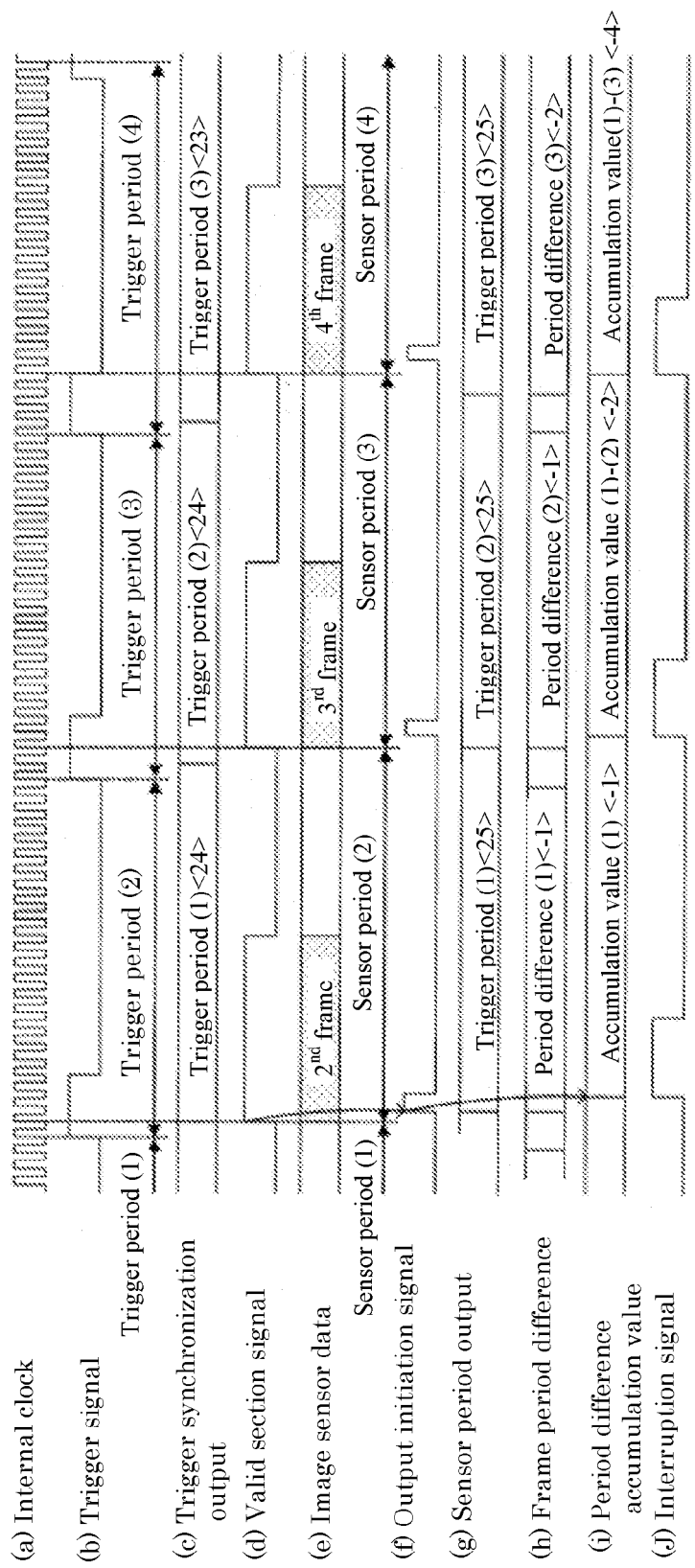
FIG. 4 is a timing chart showing an operation of a trigger synchronization control unit.

A block diagram showing a configuration example of the trigger synchronization control unit 21 is shown in FIG. 3, and a time chart showing the operation of trigger synchronization control unit 21 is shown in FIG. 4.

The trigger signal (FIG. 4(b)) from the external device is input to the trigger period count unit 31. The trigger period count unit 31 detects the rising edge of the trigger signal, counts the period (the number of clocks) from the previous rising edge, and outputs the result in the time domain shown in FIG. 4(c) as a trigger period. Specifically, the trigger period count unit 31 detects the rising timing of the trigger signal, and holds the current counter value when the rising timing is detected, and clears the counter value after the output. Further, when the rising timing is not detected, the trigger period count unit 31 counts up at the rising of the clock as long as the counter value does not become the maximum value (in this example, 0xffffff since the counter is 24 bit). The trigger signal in this example is a high active signal. Further, the trigger signal is generated by the external device 2, and therefore the trigger signal is asynchronous with the internal clock of the FPGA constituting the trigger synchronization control unit 21. For this reason, the trigger signal is subjected to a metastable countermeasure by an internal clock synchronization circuit (not illustrated), and a signal after being synchronized with the internal clock is used.

The valid section signal (FIG. 4(d)) output from the image sensor 11 is input to the sensor period count unit 32. The sensor period count unit 32 detects the rising edge of the valid section signal, counts the period (the number of clocks) from the previous rising edge, and outputs the result in the time domain shown in FIG. 4(g) as a sensor period. Specifically, the sensor period count unit 32 performs the rising detection of the valid section signal, holds the current count value when the rising is detected, and clears the current count value after the output. Further, when the rising is not detected, the count unit counts up at the rising of the clock as long as the counter value does not become the maximum value (in this example, 0xffffff since the counter is 24 bit). Further, the sensor period count unit 32 outputs an output initiation signal (FIG. 4(f)) that asserts only when the rising of the valid section signal is detected. The valid section signal in this example is a high active signal, and the rising edge shows the output initiation timing of the image sensor 11. Further, the valid section signal is generated by the image sensor 11. Therefore, the valid section signal is synchronized with the clock of the image sensor 11 and is asynchronous with the internal clock of the FPGA constituting the trigger synchronization control unit 21. For this reason, the valid section signal is subjected to a metastable countermeasure by an internal clock synchronization circuit (not illustrated), and a signal after being synchronized with the internal clock is used.

The trigger period and the sensor period measured as described above are input to a period difference calculation unit 33. The period difference calculation unit 33 subtracts the sensor period from the trigger period, and outputs the value as a period difference of the most recent frame in the time domain shown in FIG. 4(h). In some cases, this period difference is negative.

The period difference of the most recent frame is input to a period difference cumulative calculation unit 34, added to an internally held cumulative value of the period difference only when the aforementioned output initiation signal (FIG. 4(f) is asserted, and output to the CPU 25 in the time domain shown in FIG. 4(i) as a cumulative value of the period difference of the trigger period and the sensor period. In some cases, this period difference is negative. The cumulative value of this period difference becomes information showing the time difference from the timing of the trigger signal of the most recent frame to the timing of the sensor output initiation.

To notify the completion of the calculation of the period difference cumulative value of the CPU 25, the interruption signal creation unit 35 asserts the interruption signal (FIG. 4(j)) at the timing when the output initiation signal is asserted, and notifies the CPU 25.

Figure 5:
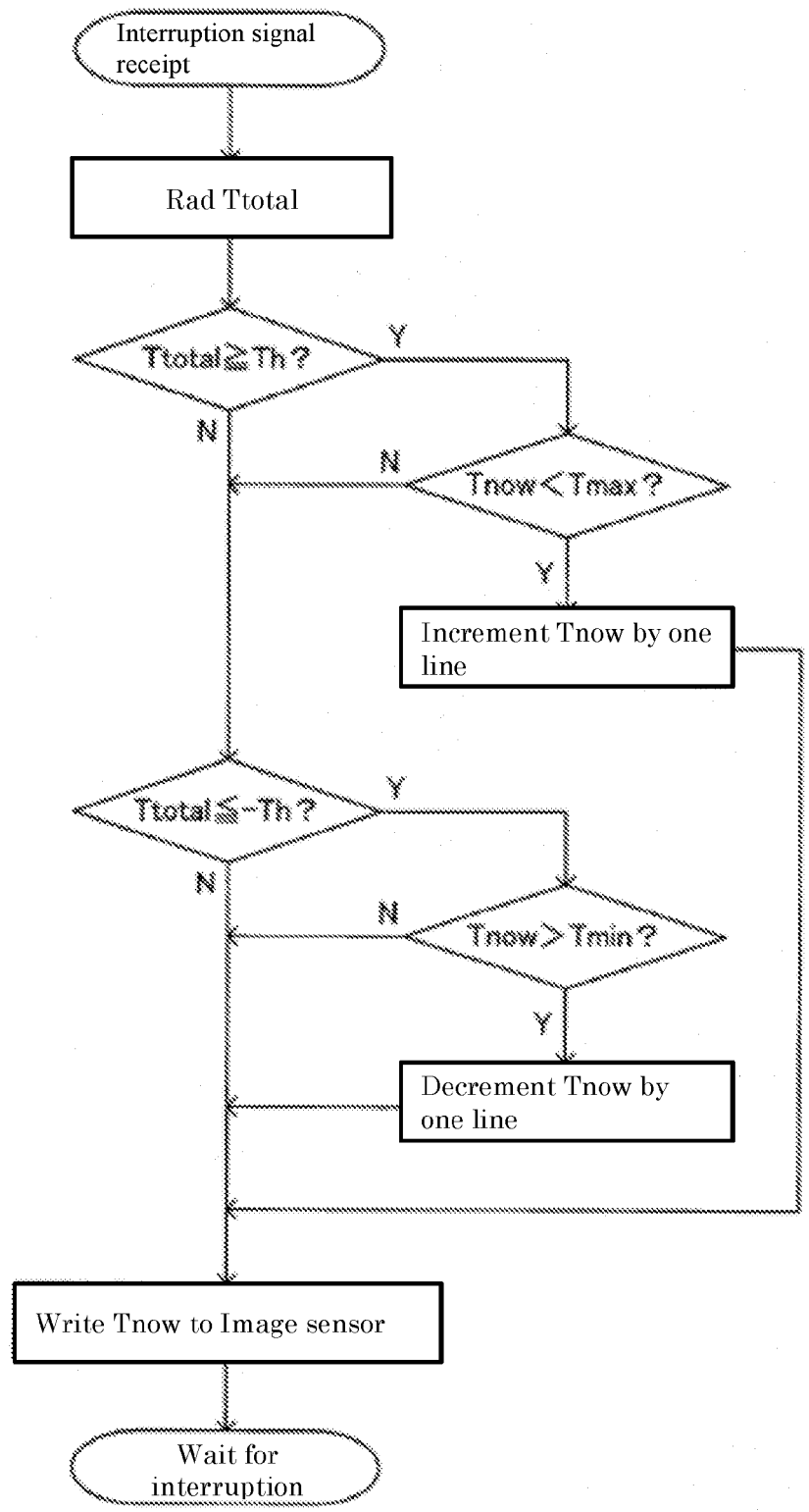
FIG. 5 is a flowchart showing an operation of a CPU when an interruption signal is received.

When the CPU 25 received the interruption signal from the trigger synchronization control unit 21, the CPU 25 reads the cumulative value of the period difference output from the trigger synchronization control unit 21 and compares it with a previously set value to determine a set value of the frame period of the image sensor 11, and then update the set value of the frame period of the image sensor 11. The operation flow of the CPU 25 when the CPU 25 received the interruption signal is shown in FIG. 5. Here, it is assumed that the frame period of the image sensor 11 in this example can be set in time unit corresponding to one line period.

In the CPU 25, a threshold Th of a period difference cumulative value, a frame period setting maximum value Tmax, and a frame period set minimum value Tmin are set in advance. Further, as the current frame period set value Tnow, an initial value of a frame period is set. Further, the same value is set in the register of the frame period of the image sensor 11. The threshold Th is a clock unit and is a positive value. The frame period set maximum value Tmax and minimum value Tmin, and the current frame period set value Tnow are each one line period unit of the image sensor 11 and these are all positive values. Each of these values is set at the time of initial operation, which will be described.

As shown in FIG. 5, when the CPU 25 receives an interruption signal, the CPU 25 reads the frame period difference cumulative value Ttotal output from the trigger synchronization control unit 21. And the CPU 25 compares the frame period difference cumulative value Ttotal and the threshold Th. When the frame period difference cumulative value Ttotal is equal to or larger than the threshold Th, the CPU 25 compares the current frame period set value Tnow of the image sensor 11 and the frame period set maximum value Tmax. When the current frame period set value Tnow does not exceed the maximum value Tmax, the frame period set value Tnow is increased by the time of one line (settable one unit). When the frame period difference cumulative value Ttotal is smaller than the threshold Th, or when the current frame period set value Tnow is equal to or larger than the maximum value, the CPU 25 subsequently compares the frame period difference cumulative value Ttotal and a value multiplied by −1 to the threshold Th. When the frame period difference cumulative value Ttotal is equal to or smaller than the threshold −Th, the CPU 25 compares the frame period set value Tnow and the frame period set minimum value Tmin. When the frame period set value Tnow is larger than the minimum value Tmin, the CPU decreases the frame period set value Tnow by the time of one lone. When the frame period difference cumulative value Ttotal is larger than the value multiplied by −1 to the threshold Th, or when the frame period set value Tnow is equal to or smaller than the minimum value Tmin, the value of the frame period set value Tnow is used as it is. Thereafter, the CPU 25 writes the frame period set value Tnow determined as described above to the register of the frame period of the image sensor 11 via the communication control unit 24. After completion of writing to the register, the CPU 25 again waits for the generation of interruption.

The interruption signal is generated every time the head image data of each frame is input, the setting of the frame period of the image sensor 11 is performed for each frame.

One example of an actual synchronous control setting and operation is shown in FIG. 6. Hereinafter, the explanation will be made with reference to the Table of FIG. 6. In this example, the frame rate of the external device 2 is 60 fps, the trigger signal is asserted every 16.666 ms. The one line period of the image sensor 11 is fixed to 15.72 μs by the specification of the sensor, the clock frequency of FPGA constituting the trigger synchronization control unit 21 is 100 MHz. For this reason, when converted into the number of clocks of FPGA, one line period of the image sensor 11 becomes 1,572 clocks, and the trigger period becomes 1,666,667 clocks. Actually, since the trigger signal is not synchronized with the clock of FPGA, the value may shift depending on the frame. However, to simplify the explanation, it is assumed that the period of the trigger is fixed at 1,666,667 clocks.

As the initial setting operation of the synchronous control, the period of the trigger signal is divided by the period of one line of the image sensor 11, and the obtained value is set as an initial value of the frame period set value Tnow of the image sensor 11. Specifically, 1,666,667 clocks÷1,572 clocks=1,060 lines (truncated after the decimal point) is stored as the initial value (frame set value Tnow) of the image sensor 11 and written in the register of the frame period of the image sensor 11. When the frame period set register contents are updated, in the image sensor 11, a set value of a new frame period is reflected at the next frame time after the update. Further, a value added by 1 to the initial value of the aforementioned frame period set value Tnow (1,060+1=1,061) is substituted to the frame period set maximum value Tmax, and the frame period set value Tnow as it is substituted to the frame period set minimum value Tmin. Further, as the threshold Th, a value obtained by dividing the period of one line of the image sensor 11 by 8 (1,572÷8=196) is substituted.

After performing the aforementioned setting, an external trigger operation is initiated. In the initial first frame, the initial value of the frame period set value Tnow of the image sensor 11 is 1,060 lines, and therefore the sensor period is 1,060 lines×1,572 clocks=1,666,320 clocks (see the column of "frame No. 1: sensor period"). For this reason, the difference between the trigger period and the sensor period becomes 1,666,667 clocks=1,666,320 clocks=347 clocks (see the column of "frame No. 1: period difference"). Since this is a first frame, the frame period difference cumulative value Ttotal becomes 347 clocks as it is (see the column of "frame No. 1: cumulative period difference"). Since this frame period difference cumulative value Ttotal is larger than the threshold Th, and when the frame period set value Tnow is smaller than the maximum value Tmax, the frame period set value Tnow of the image sensor 11 is increased by 1 and the content of the register is updated.

In the second frame, since the frame period set value Tnow updated in the first frame will be reflected only at the time of the next frame operation, the update result has not been reflected yet, and the frame period of the image sensor 11 has no change and the period difference becomes the same as in the first frame. Therefore, the frame period difference cumulative value Ttotal becomes 693 clocks (see the column "frame No. 2: cumulative period difference"), which is larger than the threshold Th. However, the frame period set value Tnow does not become smaller than the maximum value Tmax, and therefore the frame period set value Tnow remains as it is.

In the third frame, since the frame period set value Tnow set in the first frame is reflected, it becomes 1,061 lines×1,572 clocks=1,667,892 clocks (see the column of "frame No. 3: period difference"), and the period difference becomes 1,666,667 clocks−1,667,892 clocks=−1,225 clocks (see the column "frame No. 3: period difference). Since the period difference cumulative value Ttotal becomes −532 (see the column "frame No. 3: cumulative period difference"), which is smaller than the value multiplied by −1 to the threshold Th. Further, the period difference cumulative value Ttotal is larger than the frame period set minimum value Tmin, and therefore the register setting is performed by subtracting the frame period set value Tnow by 1.

The aforementioned operation is performed in the same manner in the fourth frame and thereafter. As the results of the all 25 frames in FIG. 6 show, the control is performed so that the frame period difference cumulative value Ttotal falls within a given range. This frame period difference cumulative value Ttotal becomes information showing the time difference from the trigger signal and the frame output initiation timing of the image sensor 11. The frame in which the frame period difference cumulative value Ttotal is the largest value indicates that the output timing of the image sensor 11 is early, and the frame in which the frame period difference cumulative value Ttotal is the smallest value indicates that the output timing of the image sensor 11 is late. For this reason, the value obtained by subtracting the minimum value from the maximum value of the period difference cumulative value shows the maximum value of time difference variation from the trigger signal and the frame output timing of the image sensor 11. In this example, since the period of one line of the image sensor 11 is 1,572 clocks, it can be confirmed that it is within the variation of three lines.

By the operations of the trigger synchronization control unit 21, the CPU 25, and the communication control unit 24, it becomes possible to perform an external trigger synchronization that performs the image data output initiation of the image sensor 11 within a certain time range with respect to the trigger signal from the external device 2, such as, e.g., an image display apparatus and an image recording apparatus. In this embodiment, a memory is further provided in the image input unit 22, so that the image data from the image sensor 11 can be output at a stable timing with respect to the trigger signal from the external device 2.

Figure 7:
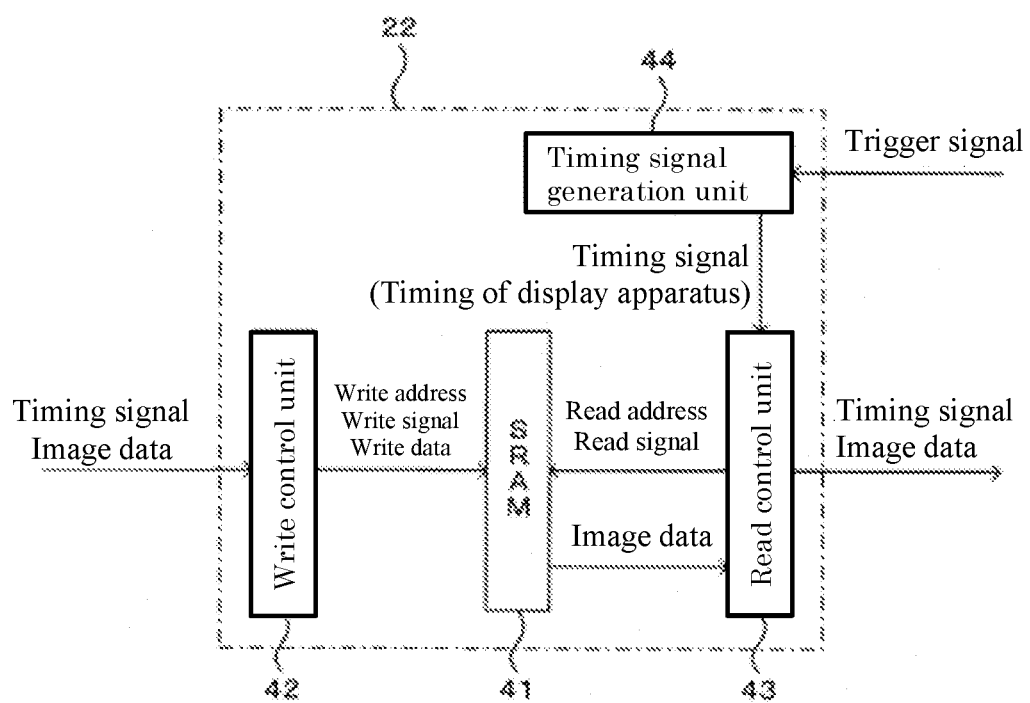
FIG. 7 is a block diagram showing a configuration example of an image input unit shown in FIG. 2.

A configuration example of the image input unit 22 is shown by a block diagram in FIG. 7. In this example, using a dual port SRAM 41 as a buffer, a write control unit 42 is connected to the write-only port, the image data and the timing signal from the image sensor 11 are input to the write control unit 42, and an image output unit 23 is connected to the read-only port of the SRAM 41 via the read control unit 43.

The write control unit 42 generates a write address of the SRAM 41, a write control signal, and write data in response to the input timing signal. Specifically, at the time of asserting the valid section signal from the image sensor 11, the write control unit 42 outputs the image data as SRAM write data, asserts the write control signal of the SRAM 41, and increments the write address of the SRAM 41 every time writing is performed. As described above, the image data is written to the SRAM 41 at the timing of the image sensor 11.

A trigger signal output from the external device 2, such as, e.g., an image display apparatus and an image recording apparatus, is input to the timing signal generation unit 44. In this timing signal generation unit 44, it generates a timing signal that matches the specification of the external device 2 on the basis of the trigger signal. The generated timing signal is input to the read control unit 43, and this read control unit 43 generates the read address of the SRAM 41 and a read signal depending on the input timing signal. Specifically, when the timing signal is asserted, the read control unit 43 asserts the read control signal of the SRAM 41, receives the read data, and increments the read address of the SRAM 41 every time a read request is performed. As described above, the data stored in the SRAM 41 is read based on the trigger signal from the external device 2 and output together with the timing signal.

Figure 8:
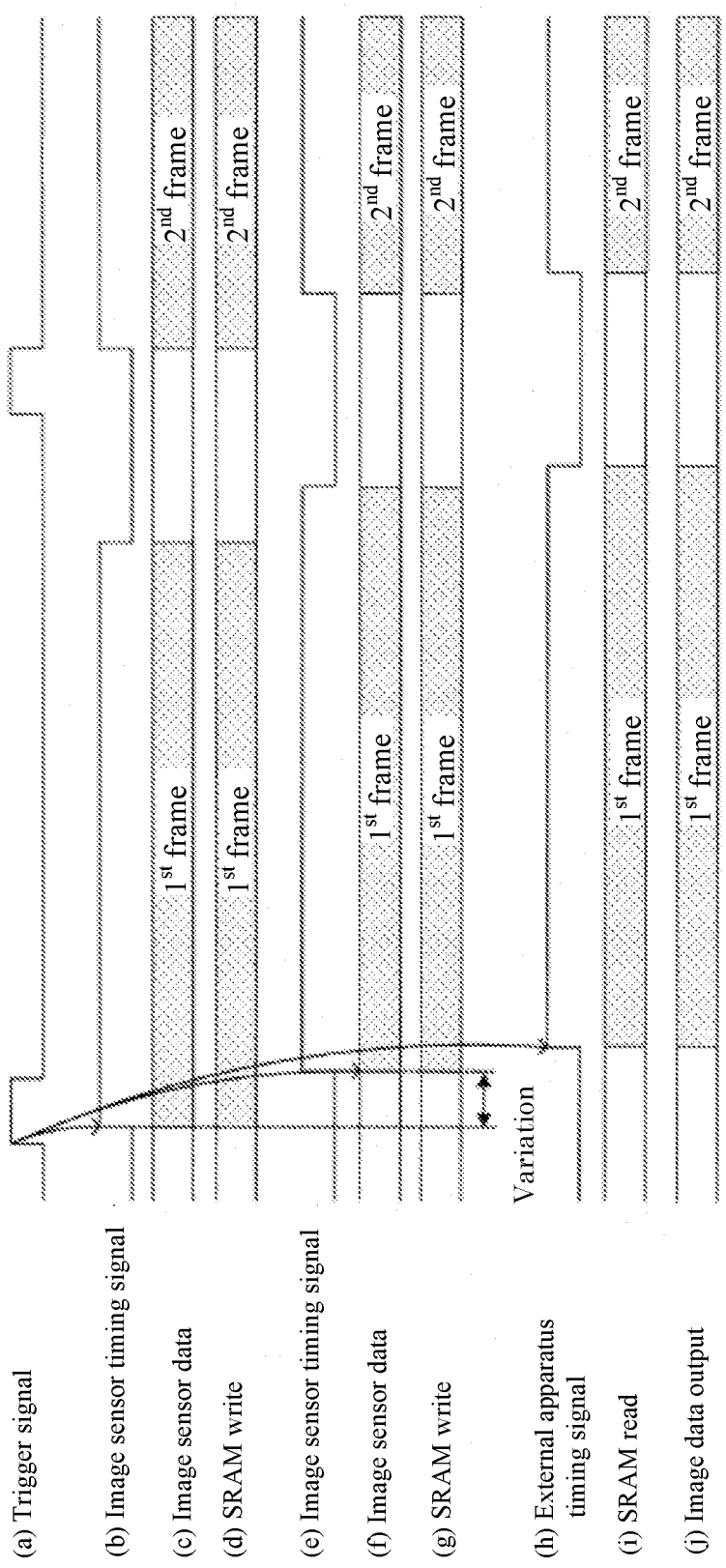
FIG. 8 is a timing chart showing an operation of the image input unit.

A timing chart of an operation of the image input unit 22 is shown in FIG. 8. On the basis of the trigger signal from the external device 2, image data of each frame is input from the image sensor 11. Depending on the external trigger synchronous operation, there is a time difference from the trigger signal to the image data output initiation of the frame as described above. A signal of a frame output earliest relative to the trigger signal of FIG. 8(*a*) is shown in FIGS. 8(*b*) and 8(*c*), and a signal output latest relative to the trigger signal is shown in FIGS. 8(*e*) and 8(*f*). The signal processing in each case will be described below.

Writing to the SRAM 41 is performed in accordance with the timing of the image sensor 11 of each frame as described above. That is, in the case of the frame output earliest, the writing is performed at the timing shown in FIG. 8(*d*), and in the case of the frame output latest, the writing is performed at the timing shown in FIG. 8(*g*). The timing signal generation unit 44, as shown in FIG. 8(*h*), initiates the timing signal for the external device 2 at the timing later than the image output initiation timing of the frame that the image sensor 11 output latest on the basis of the trigger signal. With this signal, the image data stored in the SRAM 41 is read and output. The initiation of this timing signal is always a constant timing from the trigger signal. For this reason, the image signal can be transmitted to the external device 2 at a stable timing relative to the trigger signal. The capacity of the dual port SRAM 41 requires an accumulation amount of more than the data amount corresponding to the variation of the time difference from the trigger signal to the output initiation of the image sensor 11 (time from the frame output earliest to the output initiation of the frame output latest). In the example shown in FIG. 6, since the variation is suppressed three lines or less, in this example, it will be sufficient if there is a capacity capable of storing data of three to four lines.

According to the aforementioned embodiment of the present invention, by monitoring the time difference from the trigger signal from the external device 2, such as, e.g., an image display apparatus and an image recording apparatus, to the output initiation timing of the image data from the image sensor 11 and setting the frame period of the image sensor so that the time difference falls within a given range, although there is some degree of variation in the time difference from the trigger signal to the output initiation of the image data, the time difference can be set within the given range, which makes it possible to perform controlling corresponding to the external trigger synchronization.

Further, by proving a memory (SRAM 41) for temporarily storing image data, and its circuits for a write control unit 42 and a read control unit 43 to perform writing of the image data to the memory at the timing of the image sensor 11 and reading the memory at a given timing later than the timing of the frame performed the image output initiation latest relative to the trigger signal, it becomes possible to output image data at a stable timing relative to the trigger signal.

In the aforementioned embodiment, a part of the operation of the trigger synchronous control is realized by mounting the CPU 25. However, the part may be realized by a hardware performing the same calculation.

In the aforementioned example, the period of the image output of the image sensor is calculated by monitoring the timing signal of the image data. However, it may be calculated from the integration of a known one line period of the image sensor 11 and a frame period set value.

Further, the time difference from the trigger signal to the output initiation timing of the image data from the image sensor 11 is calculated from the cumulative value of each of the period differences. However, it may be configured to measure the time from the trigger signal to the image data output initiation for each frame.

DESCRIPTION OF SYMBOLS

1 image pickup apparatus
2 external device (display apparatus/recording apparatus)
11 image sensor
12 optical lens
13 sensor control unit
14 crystal oscillator
21 trigger synchronization control unit
22 image input unit
23 image output unit
24 communication control unit
25 CPU
31 trigger period count unit
32 sensor period count unit
33 period difference calculation unit
34 period difference cumulative calculation unit
35 Interruption signal creation unit
41 SRAM
42 write control unit
43 read control unit
44 timing signal generation unit

The invention claimed is:

1. A control apparatus for an image pickup apparatus equipped with an image sensor for outputting image data, comprising:
   external trigger signal receiving means configured to receive a trigger signal from an external device to which the image data is output;
   image data receiving means configured to receive the image data from the image sensor;
   time difference calculation means configured to calculate information of a time difference from the trigger signal to a time point at which the image sensor initiates an output of the image data for each frame, based on respective received results of the external trigger signal receiving means and the image data receiving means; and frame period set means configured to set a frame period of the image sensor, wherein the frame period set means is configured to set a frame period of the image sensor so that the time difference falls within a given range, on a basis of the information of the time difference calculated by the time difference calculation means.

2. The control apparatus for an image pickup apparatus as recited in claim 1, wherein the frame period of the image sensor is capable of setting only at a specified time unit, wherein the time difference calculation means includes trigger period measurement means configured to measure a time from a time point of receiving a last trigger signal every time the trigger signal is received, frame period measurement means configured to measure a time from an initiation time point of receiving the last image data every initiation of receiving the image data from the image sensor, period difference calculation means configured to calculate a period difference between the trigger period and the frame period, and period difference accumulation means configured to accumulate the period difference calculated by the period difference calculation means for each frame, wherein a cumulative value of the period difference calculated by the period difference calculation means is used as the information of the time difference, and wherein the frame period set means compares the cumulative value of the period difference and a threshold, and uses a compared result as one condition of setting change of the frame period of the image sensor.

3. The control apparatus for an image pickup apparatus as recited in claim 1, further comprising:

a buffer configured to temporality store the image data from the image sensor;

write control means configured to control writing to the buffer; and read control means configured to control reading from the bugger, wherein the write control means performs writing to the buffer at an image data output timing of the image sensor, and wherein the read control means performs reading of the image data from the buffer at a timing later than a timing of the writing in a state in which a time difference from the trigger signal to the output initiation of the image data is maximum.

4. The control apparatus for an image pickup apparatus as recited in claim 2, further comprising:

a buffer configured to temporality store the image data from the image sensor;

write control means configured to control writing to the buffer; and read control means configured to control reading from the bugger, wherein the write control means performs writing to the buffer at an image data output timing of the image sensor, and wherein the read control means performs reading of the image data from the buffer at a timing later than a timing of the writing in a state in which a time difference from the trigger signal to the output initiation of the image data is maximum.

5. A method for controlling an image pickup apparatus equipped with an image sensor that outputs image data, comprising:

receiving a first trigger signal from an external device to which the image data is output;

receiving first image data from the image sensor;

for each frame of plural frames of the image data, calculating information of a first time difference from the first trigger signal to a time point at which the image sensor initiates an output of the first image data, based on the receiving of the first trigger signal and the receiving of the first image data; and changing a frame period of the image sensor so that a second time difference falls within a given range on a basis of the information of the first time difference.

6. The method of claim 5, wherein the calculating information of a first time difference comprises:

determining a trigger period by measuring a time from a time point of receiving a last trigger signal every time the trigger signal is received, determining a frame period by measuring a time from an initiation time point of receiving the last image data every initiation of receiving the image data from the image sensor, calculating a period difference between the trigger period and the frame period, and accumulating each of the period difference calculated by the period difference calculation means for each frame to obtain a cumulative value, wherein the cumulative value is used to determine the information of the first time difference, and wherein changing the frame period of the image sensor is responsive to comparing the cumulative value to a threshold.

7. The method of claim 6, further comprising:

temporarily storing the image data received from the image sensor in a buffer at an image data output timing of the image sensor, and reading the image data from the buffer in response to a time difference between the trigger signal to an output initiation of the image data being maximum.

8. The method of claim 5, further comprising:

temporarily storing the image data received from the image sensor in a buffer at an image data output timing of the image sensor, and reading the image data from the buffer in response to a time difference between the trigger signal to an output initiation of the image data being maximum.

* * * * *